No. 712,616. Patented Nov. 4, 1902.
A. H. STRASSBURGER.
SPECTACLES.
(Application filed July 3, 1902.)
(No Model.)
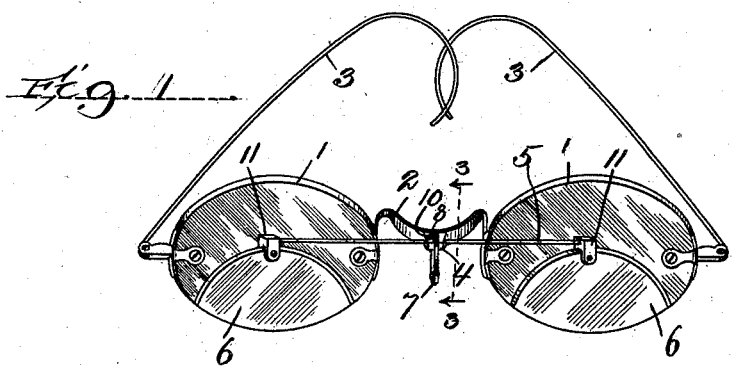
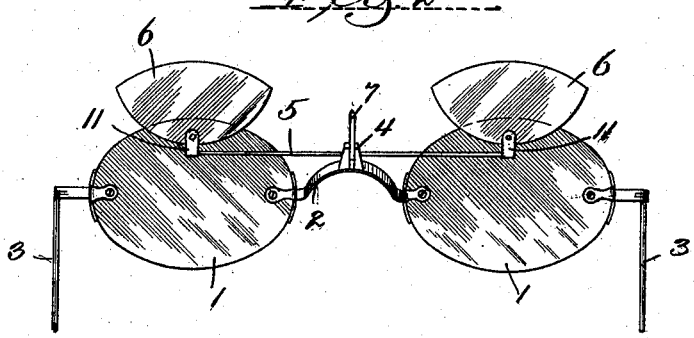
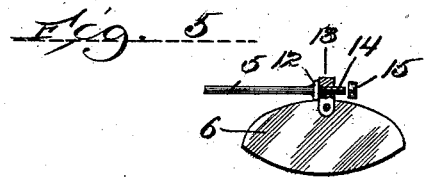
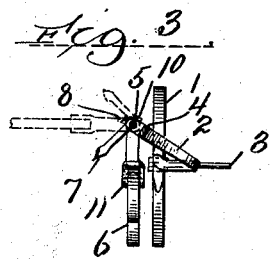
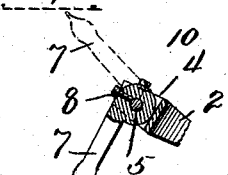
Witnesses:
Harry C. Leslie
Ray White
Inventor:
Arnold H. Strassburger
By Jesse & H. M. Cox
Attorneys

UNITED STATES PATENT OFFICE.

ARNOLD H. STRASSBURGER, OF CHICAGO, ILLINOIS.

SPECTACLES.

SPECIFICATION forming part of Letters Patent No. 712,616, dated November 4, 1902.

Application filed July 3, 1902. Serial No. 114,236. (No model.)

*To all whom it may concern:*

Be it known that I, ARNOLD H. STRASSBURGER, a citizen of the United States, residing in the city of Chicago, county of Cook, and State of Illinois, have invented a new and useful Improvement in Spectacles, of which the following is a specification.

My invention relates to spectacles for improving the vision.

It is well known that in adults of mature age it is frequent for the eyes to lose in a great measure the faculty of accommodation of the focal lenses of the eye to objects near at hand. In other words, it is common for aged persons to require two kinds of lenses when reading or viewing objects close at hand—one kind of lens for correcting imperfections in the eye, such as astigmatism or other troubles requiring correction at all times, both when viewing at a distance and near at hand, and an additional or supplementary lens for magnifying the object when near at hand. In such cases two sets of spectacles are sometimes used, one set being employed all the time and the second set being also put before the eyes for close objects. It is also common to employ bifocal lenses—that is to say, lenses consisting of two pieces, the upper piece being corrective and the lower piece magnifying. This type of spectacles, however, has the disadvantage of refracting the rays at the line of juncture of the two lenses, with the result that the object may appear distorted.

The object of my invention is to eliminate the necessity for two separate sets of spectacles and also avoid the inconvenience due to refraction, as in bifocal lenses. I attain this object by the device illustrated in the accompanying drawings, in which—

Figure 1 is a perspective view of a pair of spectacles embodying my invention, the supplementary lenses being shown down in a position for use. Fig. 2 is a front view of the spectacles, showing the supplementary lenses turned up and out of use. Fig. 3 is an edge sectional view taken on the line 3 3, Fig. 1. Fig. 4 is also an enlarged fragmentary view showing the construction of the parts adjacent to the controlling-lever. Fig. 5 shows an alternative method of mounting the supplementary lenses.

Similar reference characters denote similar parts throughout the several views.

The main corrective lenses 1 are connected by the bridge-piece 2 and are provided with the side wires 3 in the ordinary manner. The bifurcated lug 4 is mounted upon said bridge-piece and is transversely apertured to loosely receive the cross-rod 5, which carries the supplementary lenses 6. The operating-lever 7 is rigidly secured to said rod 5 between the bifurcated portions of said lug, and therefore is operative both to rotate said rod in its bearing and to prevent lateral movement of said rod. Said lever may be soldered to said rod or secured thereto in any other suitable manner, but by preference a set-screw 8 is employed. In this preferred construction the lever is apertured to receive said rod 5, and the set-screw 8 is screwed into said rod in such a manner that its inner extremity abuts said rod and forms a rigid connection between the parts. The outer extremity of said lever is pear-shaped and pointed sharply enough so that it will engage the wearer's finger for rotating said rod. By this construction it is unnecessary to employ two fingers, which might be awkward on account of the preferred small size of the lever.

In order that the rod 5 may be able to maintain any position to which it is rotated, a friction-screw 10 is provided in the lug 4, said screw abutting against said rod and serving to regulate the amount of friction, as required. The lenses 6 are attached to the extremities of said rods in such a position that when down said lenses occupy a location in front of the lower portion of the main lenses 1, but when raised are substantially above said main lenses, so as not to obstruct the vision. Said supplementary lenses may be secured to said rod 5 by means of the clamp 11, riveted to said lenses and soldered onto said rod, as shown in Figs. 1 and 2, or the alternative construction shown in Fig. 6 may be employed. In this alternative construction the head 12 is formed near the extremity of the rod 5, and the clamp 13 is threaded, so as to screw onto the threaded portion 14 of said rod beyond said head. The lock-nut 15 is then screwed onto said portion 14, so as to bind said clamp 13 rigidly in place.

In operation when the wearer wishes to see close at hand the supplementary lenses 6 are lowered to the position shown in Fig. 1. When, however, said supplementary lenses are not required, the wearer places the finger against the pointed extremity of the lever 8 and rotates the rod 5, so as to throw the lenses 6 up out of the way to the position shown in Fig. 2. On account of the friction caused by the friction-screw 10 said lenses will remain in this raised position until again lowered by the wearer.

It is obvious that the supplementary lenses may be mounted upon so-called "nose-glasses" in the same manner as is here shown, this invention being independent of the manner of attaching the glasses to the face of the wearer.

What I claim as new, and desire to secure by Letters Patent, is—

1. In combination, a pair of spectacles, a lug on the bridge-piece thereof, a transverse rod revolubly mounted therein, supplementary lenses carried by said rod, and an arm located between said lenses and extending at substantially right angles from said rod and adapted to be grasped by the operator to rotate said lenses.

2. In combination, a pair of spectacles, a lug on the bridge-piece thereof, a transverse rod revolubly mounted therein, supplementary lenses carried by said rod, an arm extending at substantially right angles from said rod for rotating said lenses, and a point at the extremity of said arm for engaging the finger of the operator.

3. In combination, a pair of spectacles, a lug on the bridge-piece thereof, a transverse rod revolubly mounted therein, supplementary lenses carried by said rod, and a friction-screw in said lug for regulating the friction of rotation of said rod in said lug.

ARNOLD H. STRASSBURGER.

Witnesses:
  HOWARD M. COX,
  S. WOLF.